(12) United States Patent
Hermes et al.

(10) Patent No.: US 9,964,180 B2
(45) Date of Patent: May 8, 2018

(54) GEARING HAVING A PINION AND A WHEEL

(71) Applicant: SEW-EURODRIVE GMBH & CO. KG, Bruchsal (DE)

(72) Inventors: Jörg Hermes, Bruchsal (DE); Björn Sievers, Heidelberg (DE); Michael Josef Herberger, St. Leon-Rot (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days. days.

(21) Appl. No.: 14/912,336

(22) PCT Filed: Jul. 10, 2014

(86) PCT No.: PCT/EP2014/001897
§ 371 (c)(1),
(2) Date: Feb. 16, 2016

(87) PCT Pub. No.: WO2015/022042
PCT Pub. Date: Feb. 19, 2015

(65) Prior Publication Data
US 2016/0201759 A1    Jul. 14, 2016

(30) Foreign Application Priority Data
Aug. 14, 2013 (DE) ................ 10 2013 013 470

(51) Int. Cl.
*F16H 1/16* (2006.01)
*F16H 1/20* (2006.01)
*F16H 55/22* (2006.01)

(52) U.S. Cl.
CPC ............... *F16H 1/16* (2013.01); *F16H 55/22* (2013.01)

(58) Field of Classification Search
CPC ............ F16H 1/145; F16H 55/22; F16H 1/16
See application file for complete search history.

(56) References Cited

U.S. PATENT DOCUMENTS

| 2,696,125 A | * | 12/1954 | Saari | ................. | B23F 5/24 74/459.5 |
| 2,810,305 A | * | 10/1957 | Brinza | ................. | F16H 3/003 477/18 |
| 2,812,668 A | * | 11/1957 | Holt | ................. | F16H 55/22 74/458 |
| 2,908,187 A | | 10/1959 | Saari | | |

(Continued)

FOREIGN PATENT DOCUMENTS

EP    2 406 522    4/2013

OTHER PUBLICATIONS

International Search Report, dated Dec. 23, 2014, issued in corresponding International Application No. PCT/EP2014/001897.

(Continued)

*Primary Examiner* — Jake Cook
(74) *Attorney, Agent, or Firm* — Andrews Kurth Kenyon LLP

(57) ABSTRACT

A gearing is described as having a pinion and a wheel, the wheel having two toothing regions which are set apart from each other, in particular on one of its end faces, the toothing of the pinion meshing with the toothing regions, the toothing in particular being continuous, i.e., uninterrupted throughout, the pinion axis being perpendicular to and set apart from the wheel axis.

13 Claims, 6 Drawing Sheets

(56) References Cited

U.S. PATENT DOCUMENTS

| | | | | |
|---|---|---|---|---|
| 3,386,305 A * | 6/1968 | Wildhaber | ............. | B23F 5/202 407/20 |
| 3,768,326 A * | 10/1973 | Georgiev | ............... | F16H 1/145 74/425 |
| 5,501,117 A * | 3/1996 | Mensing | ................ | F16H 1/125 74/420 |
| 7,044,691 B2 * | 5/2006 | Zhang | .................... | B23F 13/02 409/12 |
| 2005/0028626 A1 * | 2/2005 | Fleytman | ................. | F16H 1/08 74/416 |
| 2005/0028627 A1 * | 2/2005 | Fleytman | ................. | F16H 1/08 74/416 |
| 2008/0172877 A1 * | 7/2008 | Leibold | ................ | F16H 57/033 29/893.1 |
| 2012/0000305 A1 | 1/2012 | Kazkaz et al. | | |

OTHER PUBLICATIONS

International Search Report, dated Aug. 20, 2014, issued in corresponding International Application No. PCT/EP2014/001593.
International Preliminary Report on Patentability issued in PCT/EP2014/001897, dated Mar. 4, 2016.

* cited by examiner

GEARING HAVING A PINION AND A WHEEL

FIELD OF THE INVENTION

The present invention relates to a gearing having a pinion and a wheel.

BACKGROUND INFORMATION

It is known from European Patent No. 2,406,522 B1 to provide a pinion with different types of toothing regions and to bring it into engagement with a wheel whose axis is aligned at an incline, i.e., is spaced apart from, and not perpendicular to, the pinion axis.

SUMMARY

Therefore, the present invention is based on the objective of further developing a gearing having a pinion and a wheel, by which a high torque is able to be transmitted using a small design.

Important features of the invention in the gearing having a pinion and a wheel are that the wheel has two toothing regions on one of its face sides, which are set apart from each other, the in particular uninterrupted toothing of the pinion meshes with the toothing regions, the toothing in particular being contiguous, i.e., uninterrupted throughout, the pinion axis is perpendicular to and set apart from the wheel axis, i.e., the pinion axis and the wheel axis cross at a right angle, in particular.

This has the advantage that the toothing of the pinion is able to be developed in an uncomplicated and cost-effective manner, in particular because it can be produced in a single working step. In addition, it is easy to align the pinion in relation to the wheel and to support it in the housing with the aid of bearings, since a right angle of the pinion axis in relation to the wheel axis is easily realizable during the production.

In one advantageous development, the pinion is cylindrical, i.e., especially not conical, the pinion in particular being a cylinder worm shaft and consequently having a $Z_A$, $Z_I$ or $Z_K$ profile, in particular.

In one advantageous development, the toothing profile of the toothing of the pinion is the same all over and/or is not variable in the direction of the pinion axis, and/or is the same in both individual engagement regions. This has the advantage that a toothing can be used that is easy to produce.

In one advantageous development, the toothing of the pinion is continuous, that is, in particular uninterrupted in the direction of the pinion axis. This advantageously allows an especially uncomplicated production.

In one advantageous development, the toothing of the pinion is a cylinder worm toothing. This is advantageous insofar as the production of the pinion is very simple since only a single flank profile, i.e., tooth profile, for instance a $Z_A$ profile, $Z_I$ profile or $Z_K$ profile.

In one advantageous development, the axial region covered by the first toothing region, that is, especially the wheel axis region, overlaps with the axial region covered by the second toothing region, that is, especially the wheel axis region. This has the advantage that the pinion axis can be aligned perpendicularly to the wheel axis.

In one advantageous development, a first toothing section is developed as a face gear, in particular a Spiroplan toothing, the teeth of the toothing section on the wheel in particular being developed in arched form, i.e., the individual teeth extending increasingly in the circumferential section as the radial clearance gets larger, in particular at an increasing peripheral angle. This has the advantage that a high torque is able to be transmitted with high efficiency and in a compact manner.

In one advantageous development, the second toothing section is a worm gear toothing, especially a globoid-shaped, globoidal or semi-globoidal worm gear toothing. This has the advantage of allowing an uncomplicated production of the worm gear toothing.

In one advantageous development, an annular depression is provided between the two toothing sections on the wheel. This is advantageous insofar as a simple production is possible because the two toothing sections are thereby spaced apart from each other. Waste during milling of the toothing is therefore able to be prevented.

In one advantageous development, the two toothing sections are radially set apart from each other. This has the advantage that the pinion is in engagement with the wheel in two regions that are spaced apart from each other in the axial direction of the pinion.

In one advantageous development, the pinion is supported on both sides, which is advantageous inasmuch as the transversal forces are deflectable.

Further advantages are derived from the dependent claims. The present invention is not restricted to the feature combination of the claims. Those skilled in the art will discover additional meaningful possibilities for combining claims and/or individual claim features and/or features of the specification and/or of the figures, that arise from the stated objective and/or the objective resulting from a comparison with the related art, in particular.

DETAILED DESCRIPTION

Figure 1:
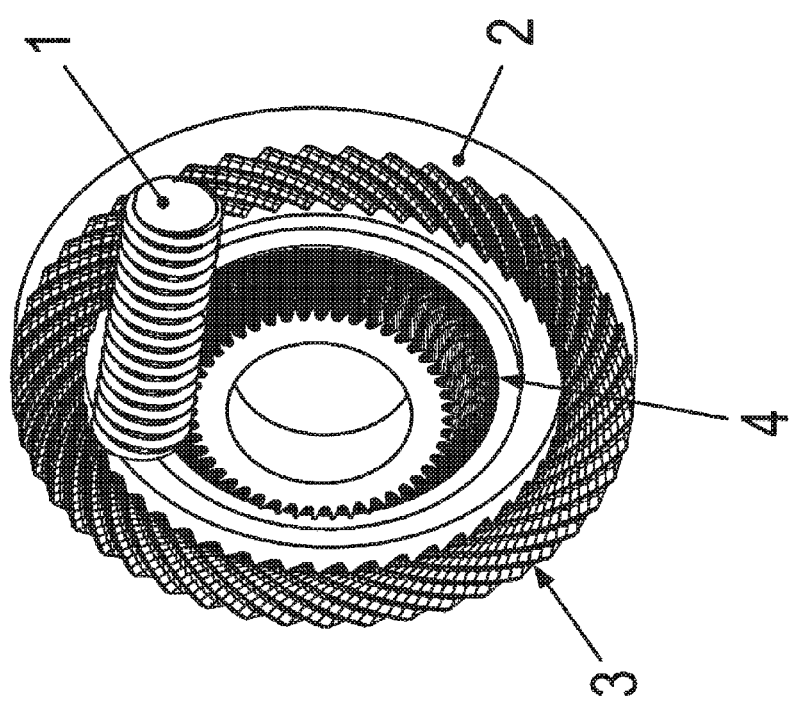
FIG. 1 shows an oblique view of a gear step according to the present invention, in a first direction of view.
Figure 2:
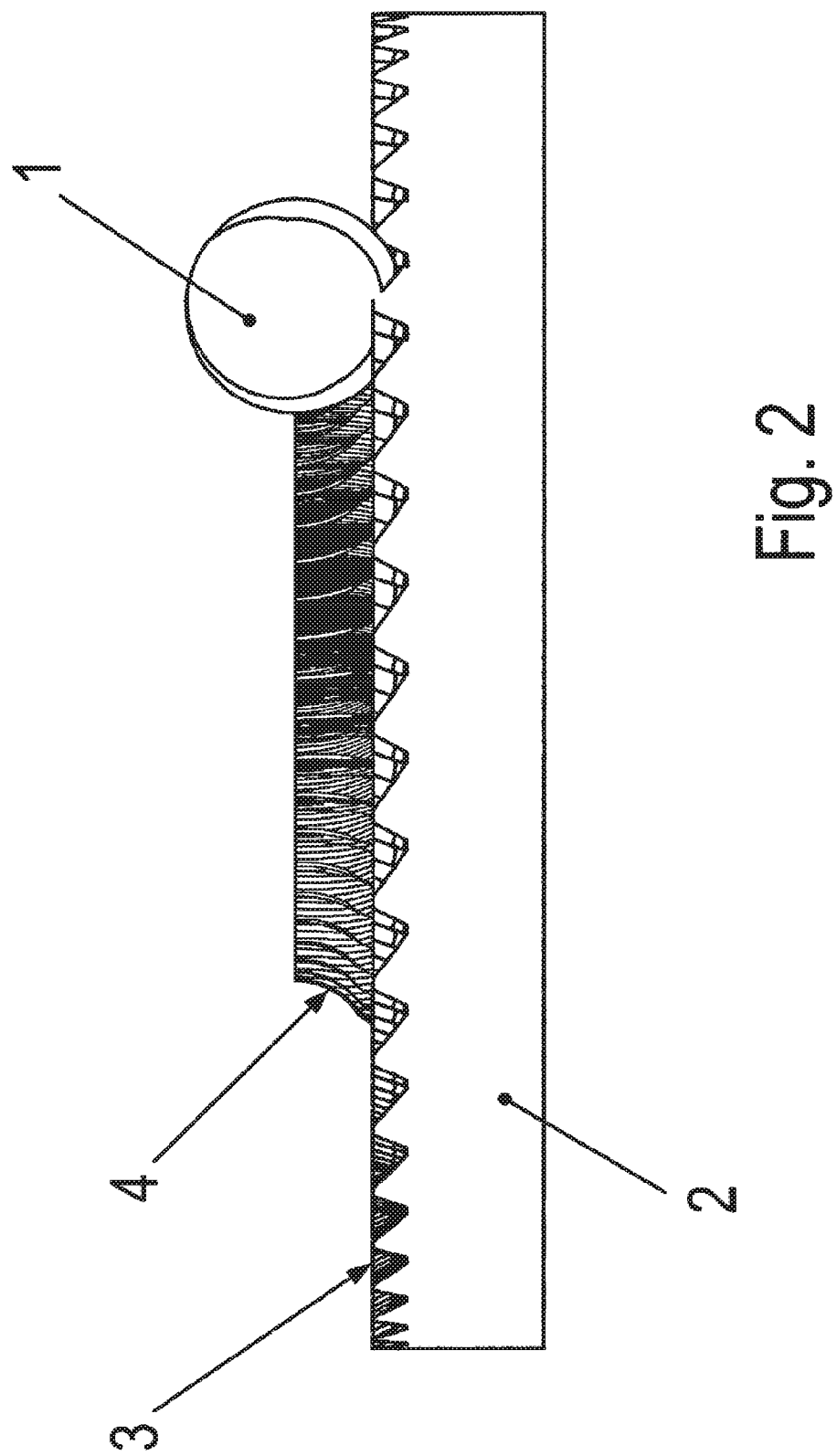
FIG. 2 shows an associated side view.
Figure 3:
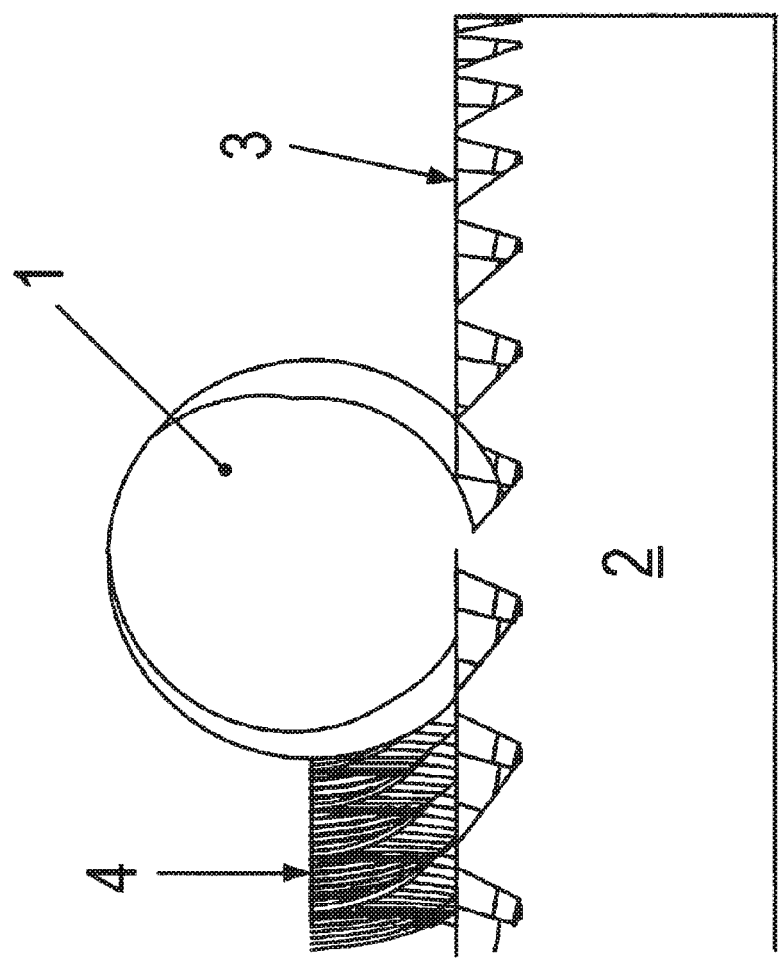
FIG. 3 shows an associated enlarged cut-away portion.
Figure 4:
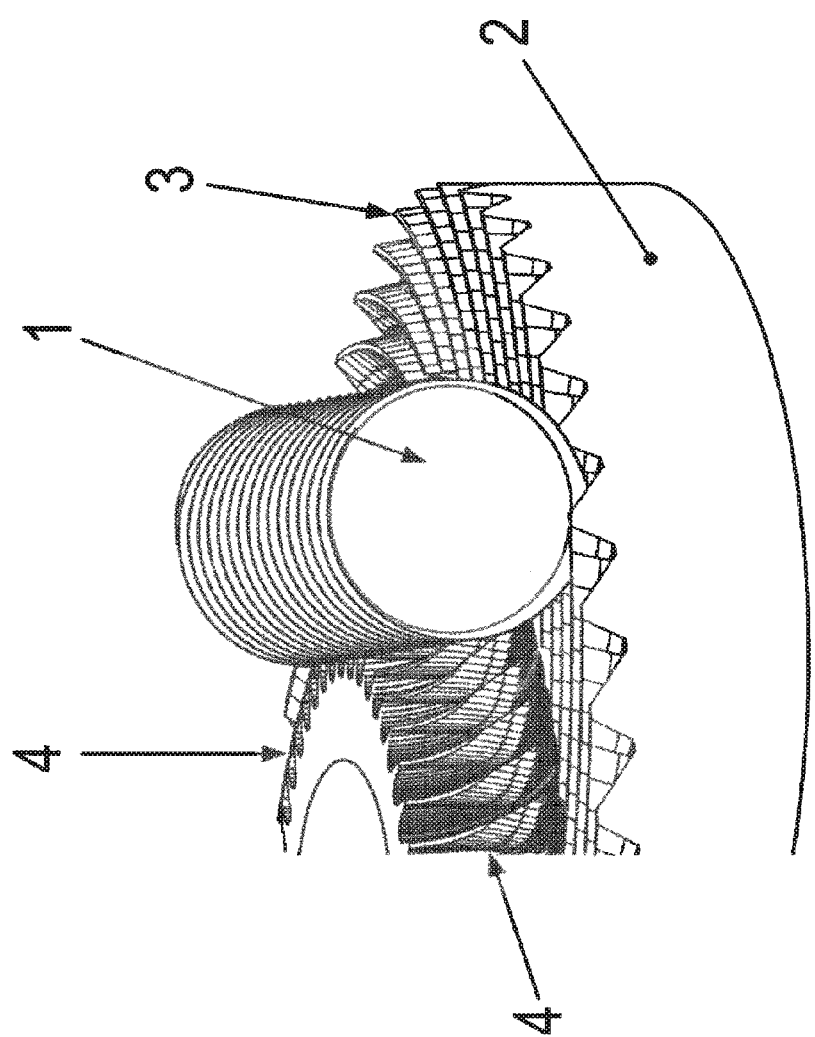
FIG. 4 shows an oblique view of a gear step according to the present invention, in a further direction of view.
Figure 5:
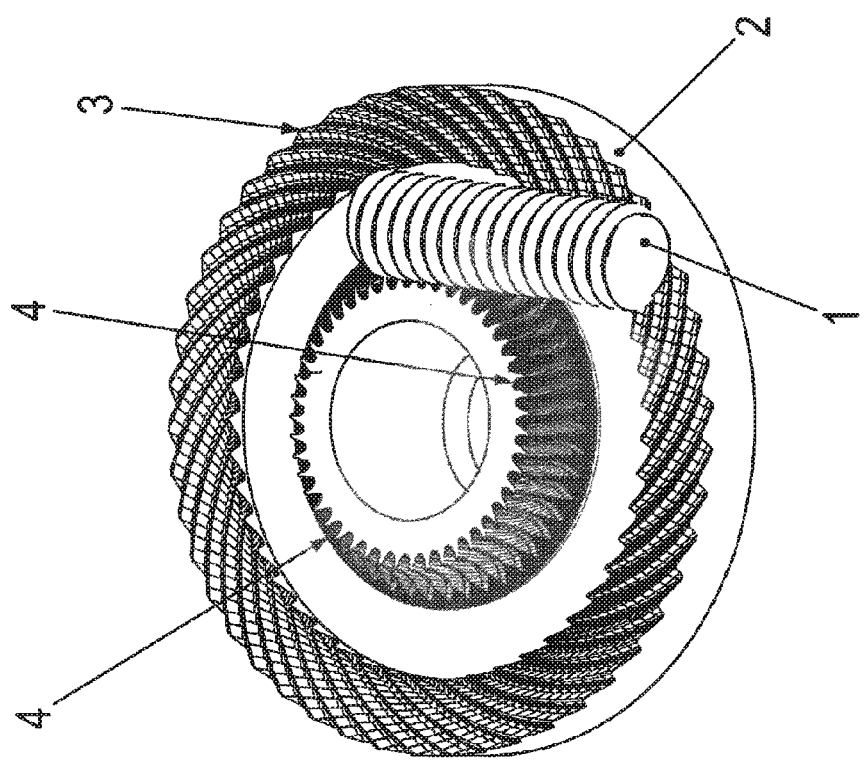
FIG. 5 shows an oblique view of a gear step according to the present invention, in a further direction of view.
Figure 6:
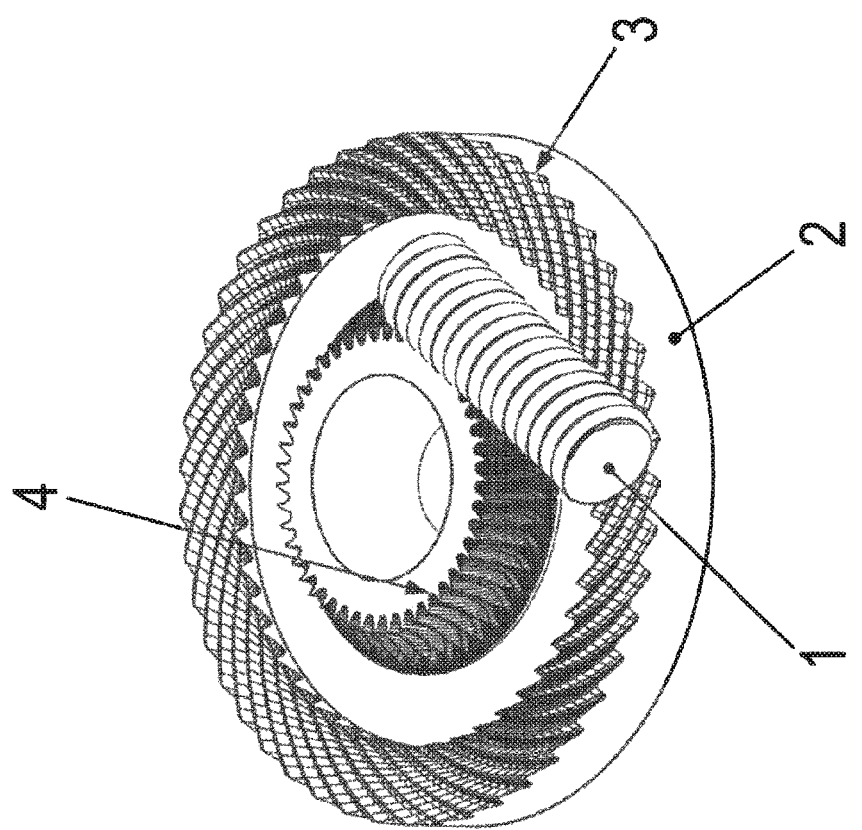
FIG. 6 shows an oblique view of a gear step according to the present invention, in a further direction of view.

As illustrated in the figures, a gearing according to the present invention has a gear step in which a pinion 1 is meshing with two toothing sections of a wheel.

The pinion is developed as a cylinder worm shaft, for which purpose the pinion in particular is provided with a worm toothing, i.e., a $Z_A$, $Z_I$ or $Z_K$ profile, for instance.

The entire worm toothing of pinion 1 is of the same kind throughout, that is to say, it has the same parameters that clearly characterize the toothing. Especially the outside diameter and the root diameter are independent of the axial position when viewed from the direction of the pinion axis. The profile, that is to say, especially the profile of the transverse section of the toothing, is therefore invariant in its spiral symmetry, the spiral corresponding to the angle of inclination of the cylinder worm gear shaft, and therefore in particular to the angle of skew of the worm toothing of pinion 1.

Pinion 1 meshes with wheel 2. The pinion axis and the wheel axis have a perpendicular alignment in relation to each other, and they are set apart by a non-vanishing distance value. Wheel 2 has two different types of toothing sections, and the pinion meshes, i.e., engages, with both toothing sections.

A first toothing section is developed as a face gear 3, in particular a Spiroplan toothing. The teeth have a curved design, that is to say, as the radial extension of the individual tooth increases, it extends increasingly in the circumferential direction, in particular at an increasing angle at circumference.

Second toothing section 4, in particular a globoid-shaped and/or semi-globoidal worm gear toothing, is no face gear but a worm gear wheel toothing.

In the axial direction, i.e., in the direction of the wheel axis, the axial region covered by the first toothing section overlaps with the axial region covered by the second toothing section.

The teeth of the worm gear wheel toothing extend only in the axial and radial direction, but not in the peripheral direction.

In a first region of its toothing, the pinion thus meshes with face gear 3, and in a region of its toothing that is set apart in the direction of the pinion axis, it meshes with the worm gear wheel toothing. The two engagement regions overlap in the circumferential direction of the pinion axis. In other words, there is an overlap of the engagement regions projected in the pinion axis direction into a plane whose direction of the surface normal is the pinion axis direction.

On account of the contact between pinion and wheel in two regions, a longer overall engagement region results because the lengths of the contact line of the two engagement regions of the two areas, i.e., the contact region with the first and the contact region with the second toothing region, are added up.

The pinion is axially supported on both sides, so that bending is reduced and/or higher stability is given and high transverse forces are able to be absorbed as a result.

On the whole, the gearing according to the present invention makes it possible to achieve high efficiency and high output performance.

LIST OF REFERENCE NUMERALS

1 pinion
2 wheel
3 face gear, in particular Spiroplan face gear
4 worm gear wheel toothing

The invention claimed is:
1. A gearing, comprising:
    a pinion; and
    a wheel, wherein:
        the wheel includes two toothing regions which are set apart from each other,
        a toothing of the pinion meshes with the toothing regions, wherein the toothing of the pinion has a $Z_A$, $Z_I$, or $Z_K$ profile, and
        a pinion axis is perpendicular to and set apart from a wheel axis.
2. The gearing as recited in claim 1, wherein the two toothing regions are set apart from each other on an end face of the wheel.
3. The gearing as recited in claim 1, wherein the toothing of the pinion is continuous.
4. The gearing as recited in claim 1, wherein at least one of:
    the pinion is a cylinder worm gear shaft,
    the pinion is cylindrical,
    a toothing profile of the toothing of the pinion the same everywhere, and
    the toothing profile is invariable in a direction of the pinion axis.
5. The gearing as recited in claim 4, wherein the pinion is not conical.
6. The gearing as recited in claim 3, wherein the toothing of the pinion is uninterrupted in a direction of the pinion axis.
7. The gearing as recited in claim 1, wherein the toothing of the pinion is a cylinder worm toothing.
8. The gearing as recited in claim 1, wherein:
    a first axial region of the wheel covered by a first toothing region overlaps with a second axial region of the wheel covered by a second toothing region.
9. The gearing as recited in claim 1, wherein a first toothing section is developed as a face gear.
10. The gearing as recited in claim 9, wherein teeth of the first toothing section on the wheel have an arched form.
11. The gearing as recited in claim 9, wherein:
    a second toothing section is a worm gear toothing corresponding to at least one of a globoid-shaped worm gear toothing, globoidal worm gear toothing, and a semi-globoidal worm gear toothing.
12. The gearing as recited in claim 11, wherein at least one of:
    an annular depression is provided between the two toothing sections on the wheel, and
    the two toothing sections are radially set apart from each other.
13. The gearing as recited in claim 1, wherein the pinion is supported on both sides.

\* \* \* \* \*